United States Patent [19]

Benton et al.

[11] Patent Number: 5,479,526
[45] Date of Patent: Dec. 26, 1995

[54] PIXEL DESIGNATOR FOR SMALL OBJECTS

[75] Inventors: Richard W. Benton, Altamonte Springs; Richard M. Rudy, Longwood; James R. Yde, Chuluota, all of Fla.

[73] Assignee: Martin Marietta, Bethesda, Md.

[21] Appl. No.: 35,597

[22] Filed: Mar. 23, 1993

[51] Int. Cl.⁶ .................................................. G06K 9/20
[52] U.S. Cl. ........................ 382/103; 382/257; 382/291; 348/172
[58] Field of Search ..................... 382/1, 51, 27, 382/31, 40, 18, 6, 36; 358/125, 126; 348/143, 171, 172

[56] References Cited

U.S. PATENT DOCUMENTS

| | | | |
|---|---|---|---|
| 4,364,089 | 12/1982 | Woolfson | 358/125 |
| 4,476,494 | 10/1984 | Tugaye | 358/222 |
| 4,499,597 | 2/1985 | Alves | 382/41 |
| 4,550,435 | 10/1985 | Hayman | 382/9 |
| 4,918,742 | 4/1990 | Simonds | 382/41 |
| 4,959,714 | 9/1990 | Lo et al. | 358/125 |
| 4,975,972 | 12/1990 | Bose et al. | 382/1 |
| 5,103,484 | 4/1992 | Stafford et al. | 358/125 |
| 5,140,416 | 8/1992 | Tinkler | 358/125 |
| 5,257,182 | 10/1993 | Luck et al. | 382/36 |
| 5,287,272 | 2/1994 | Rutenberg et al. | 382/36 |

OTHER PUBLICATIONS

Gonzalez et al, Digital Image Processing, pp. 518–533, 1992.
Addison–Wesley Publishing Co., "Gonzalez & Witz, Digital Image Processing", Advanced Book Program, Reading, Massachusetts, pp. 130–135 (1977).

Primary Examiner—Leo H. Boudreau
Assistant Examiner—David B. Anderson
Attorney, Agent, or Firm—Finnegan, Henderson, Farabow, Garrett & Dunner

[57] ABSTRACT

A targeting system which receives input data from two sources having different video characteristics. The apparatus includes a multiple-pass centroid eroder, which operates at a multiple of the video input rate. The apparatus identifies "hot spots," i.e., potential targets, and uses the identified potential targets from the two video sources to correlate targeting of submodules producing the two video signals.

4 Claims, 13 Drawing Sheets

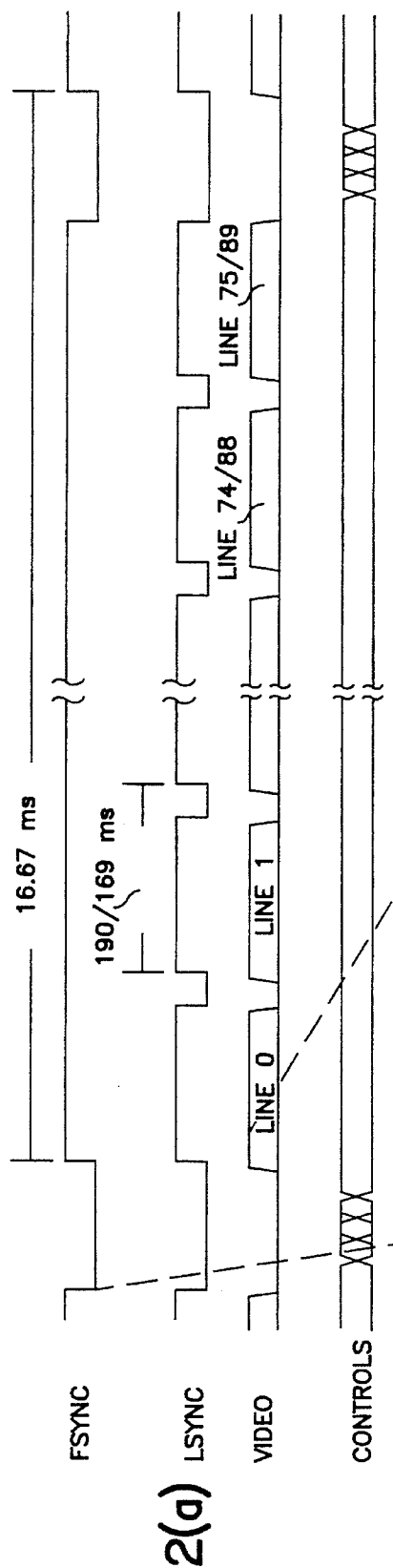
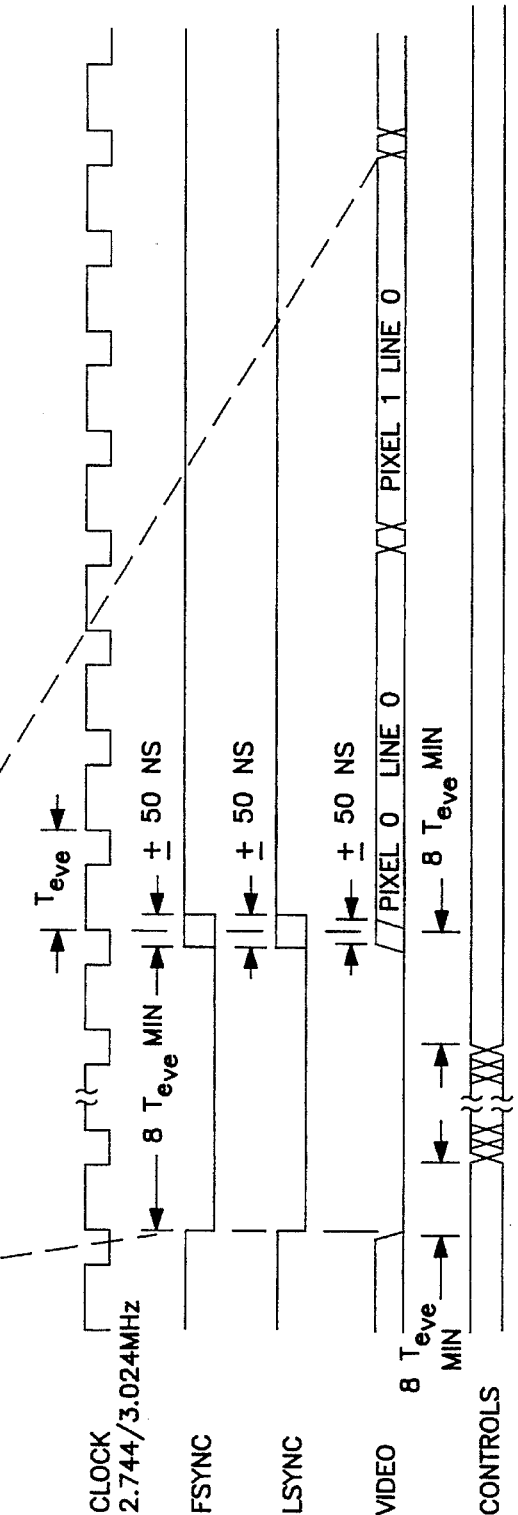

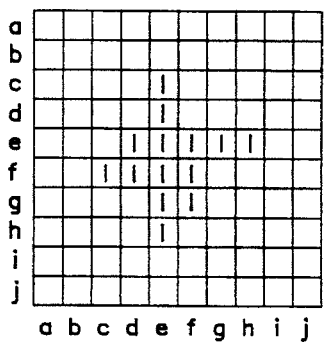
FIG. 6(a) —ORIGINAL IMAGE
—START PASS 1
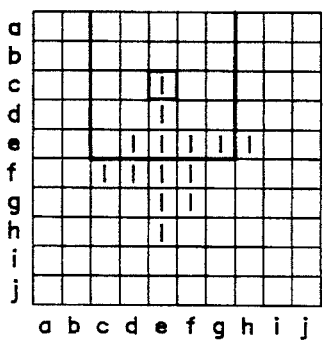
FIG. 6(b) —PIXEL ERODED BY MASK 203
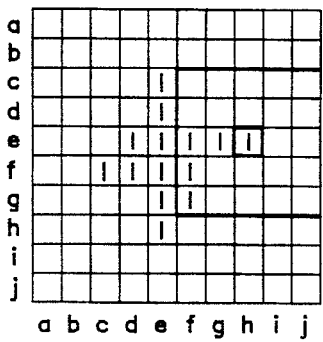
FIG. 6(c) —PIXEL ERODED BY MASK 202
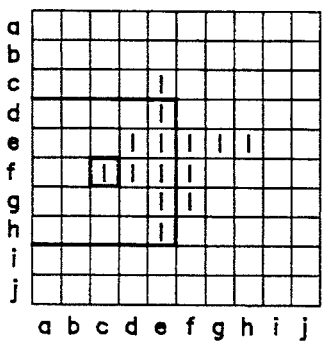
FIG. 6(d) —PIXEL ERODED BY MASK 201
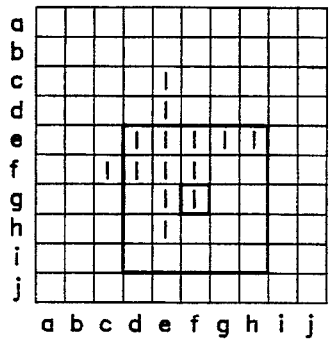
FIG. 6(e) —PIXEL ERODED BY MASK 221
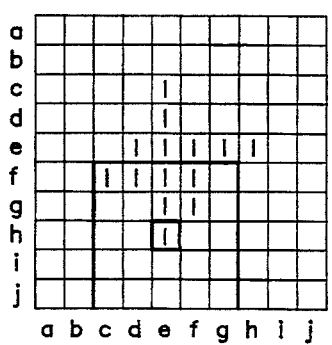
FIG. 6(f) —PIXEL ERODED BY MASK 204
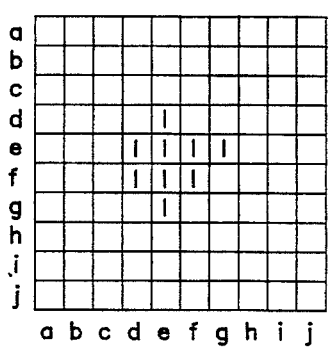
FIG. 6(g) —IMAGE AFTER EROSION PASS 1

FIG. 6(h) — START PASS 2; PIXEL ERODED BY MASK 203

FIG. 6(l) — PIXEL ERODED BY MASK 220

FIG. 6(i) — PIXEL ERODED BY MASK 225

FIG. 6(m) — PIXEL ERODED BY MASK 204

FIG. 6(j) — PIXEL ERODED BY MASK 202

FIG. 6(n) — IMAGE AFTER EROSION PASS 2

FIG. 6(k) — PIXEL ERODED BY MASK 225

—START PASS 3

—PIXEL ERODED BY MASK 211

—PIXEL ERODED BY MASK 205

—IMAGE AFTER EROSION PASS 3

PIXEL DESIGNATOR FOR SMALL OBJECTS

BACKGROUND OF THE INVENTION

This application relates to an image processing apparatus for targeting applications, and particularly to an image processing apparatus to detect "hot spots" in video image data and to reduce these spots to a single pixel. It is sometimes necessary in targeting applications to correct for variations in image data from two sources caused by the difference in location between the images. For example, in a missile system, both a targeting pod and the missile itself may generate video image data used for targeting purposes. It is desirable to be able to identify a target in the targeting pod and to have the missile automatically correlate so that it is targeting the same object as the targeting pod. Thus, it is desirable to correlate images from different image sensors with different sensitivities and dynamic ranges.

In addition, video image data often contains a large number of picture elements (pixels) that may represent desirable targets. Conventional targeting systems may attempt to detect a center of a target by, for example, detecting edges of the target area and determining a geometric center of the target area, or by determining a weighted geometric center balanced by "mass" of the target area. Another algorithm or method used by conventional systems is, e.g., the centroid tracker method.

If a center pixel of a target can be identified for image data from, for example, both a targeting pod and a missile, it is possible to correlate the single pixels so that an offset can be computed and the missile can be positioned and aimed substantially identically to the pod.

Alternately, it is desirable to identify a center pixel of a potential target for video data from a single source.

SUMMARY OF THE INVENTION

The present invention overcomes the problems and disadvantages of the prior art by using a multiple-pass centroid eroding means that operates at a multiple of the highest expected video input rate to locate a center pixel of a target. Hot spot lists indicating possible targets and the positions of the targets are constructed for first and second video sources, and the position of the second video source is adjusted until the hot spot on the lists of the first and second video sources correlate.

In accordance with the purpose of the invention, as embodied and broadly described herein, the invention is an apparatus for detecting and identifying potential target data in video data, comprising means for receiving the video data; means for performing a multiple-pass erosion function on the video data to produce data indicating a location of a potential target in the video data; and means for storing the data indicating the location of the potential target as an entry in a hot spot list.

In accordance with the purpose of the invention, as embodied and broadly described herein, the invention is an apparatus for detecting and identifying potential target data in video data, comprising means for receiving alternating first and second video data images from ones of a first and a second video source; means for performing a multiple-pass erosion function on the received video data to produce data indicating a loction of a potential target in the video data; means for storing the data indicating the location of the potential target as an entry in a hot spot list; correlation means for determining whether the first and second video data images are aligned; and correcting means for sending course correcting signals to the second video data source until the correlation means determines that the first and second video data images are aligned.

Advantages of the invention will be set forth in part in the description which follows and in part will be obvious from the description or may be learned by practice of the invention. The advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 2(a) and 2(b) are timing diagrams for signal inputs to the apparatus of FIG. 1;

FIGS. 4(a) and 4(b) show a plurality of bit masks used in the embodiment of FIG. 1;

FIG. 6(a) shows an original image that is part of input bits before a first pass of a centroid eroder included in FIG. 1;

FIG. 6(b) shows a portion of input bits during a first pass of the centroid eroder of FIG. 1;

FIG. 6(c) shows a portion of input bits during a first pass of the centroid eroder of FIG. 1;

FIG. 6(d) shows a portion of input bits during a first pass of the centroid eroder of FIG. 1;

FIG. 6(e) shows a portion of input bits during a first pass of the centroid eroder of FIG. 1;

FIG. 6(f) shows a portion of input bits during a first pass of the centroid eroder of FIG. 1;

FIG. 6(g) shows the image data after completion of the first pass of the centroid eroder;

FIG. 6(h) shows a portion of input bits during a second pass of the centroid eroder of FIG. 1;

FIG. 6(i) shows a portion of input bits during a second pass of the centroid eroder of FIG. 1;

FIG. 6(j) shows a portion of input bits during a second pass of the centroid eroder of FIG. 1;

FIG. 6(k) shows a portion of input bits during a second pass of the centroid eroder of FIG. 1;

FIG. 6(l) shows a portion of input bits during a second pass of the centroid eroder of FIG. 1;

FIG. 6(m) shows a portion of input bits during a second pass of the centroid eroder of FIG. 1;

FIG. 6(n) shows the image data after completion of the second pass of the centroid eroder of FIG. 1;

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
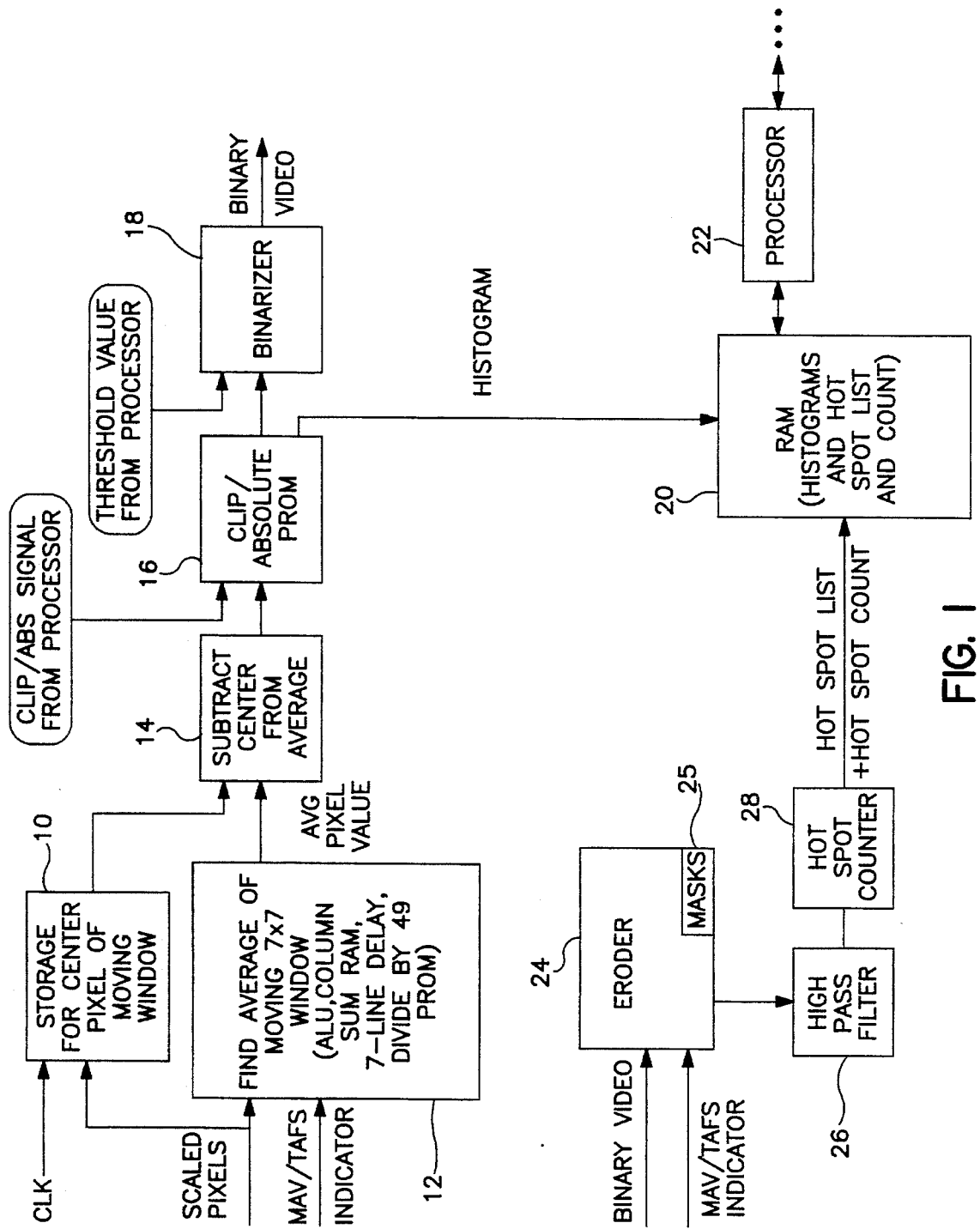
FIG. 1 is a block diagram showing a preferred embodiment of the present invention.

FIG. 1 is a block diagram of a preferred embodiment of the present invention. The described embodiment receives video data from at least two sources, identifies targets in the video data, correlates the identified targets, and adjusts the aim of the video sources in accordance with the result of the correlation. FIG. 1 includes a storage element 10, an average finder 12, a subtractor 14, a Clip/Absolute PROM 16, a binarizer 18, a RAM 20, a processor 22, a multiple-pass centroid eroder 24 (including bit masks 25), a high-pass filter 26, and a hot spot counter 28.

The apparatus of the present invention can receive input video data from at least two sources. In the described embodiment, these sources are a targeting pod's Target Acquisition FLIR (Forward Looking Infra Red) System (TAFS) and a Maverick Missile (MAV). The apparatus of FIG. 1 alternately receives a video image from the MAV and from the TAFS in scaled, pixel-serial, bit-parallel format, along with field and line sync signals FSYNCH and LSYNCH (not shown), and a clock signal CLK in accordance with the type of the video source (MAV or TAFS). A MAV/TAFS indicator line indicates whether a MAV or TAFS video image is being input. In a preferred embodiment, input video data from both sources is 8 bits in length, although other types of input data may have other bit formats. The pixels of the input video data preferably are scaled by a scaling apparatus (not shown) before being input to the apparatus of the current invention. After scaling, a pixel of MAV video data and a pixel of TAFS video data represent a same field of view, i.e., each MAV pixel and each TAFS pixel represents a substantially identical area. This scaling process is important for operation of the correlation process described below.

The following paragraphs describe a method and apparatus for obtaining binarized input data. A center pixel of a moving 7×7 pixel window of input video data is stored in storage element 10. The scaled input video data is also input to average finder 12, which determines an average intensity value of the pixels in the moving 7×7 pixel window. In subtractor 14, the center pixel intensity from storage unit 10 is subtracted from the average intensity from average finder 12 and the remainder is output to Clip/Absolute PROM 16. The purpose of subtracting a center intensity from an average intensity is to perform a high pass filter function i.e., to filter out objects that are 7 by 7 pixels or larger from the video data. In the described embodiment, desirable targets are assumed to be 7×7 pixels or smaller.

Clip/Absolute PROM 16 receives a Clip/Absolute Select signal from processor 22. The Absolute Select signal indicates whether pixels having a negative intensity value are to be passed through PROM 16 or set to a null value. If for example, it is desirable to locate targets having extremely low intensity pixels ("cold spots") instead of, or in addition to, targets having high intensity values ("hot spots"), the Absolute Select signal would be asserted, and negative intensity pixels would be changed to have a positive intensity by PROM 16. If the Absolute Select signal is not asserted, negative intensity pixels preferably are assigned a value of "0".

It should be understood that various ones of elements 10, 12 14 and 16 may be eliminated from other embodiments of the invention. In still other embodiments, it may not be necessary to binarize the video data using binarizer 18 because the video data may already be binarized when it is input.

The following discussion describes the processing used to locate targets in the binarized data. The output of clipping PROM 16 is received by binarizer 18. Binarizer 18 converts the pixels from clipping PROM 16, which may have intensities in the range of $2^n$, where n is a number of bits per pixel. In the described embodiment, n=8. Binarizer 18 outputs pixels having a value of "0" when the PROM 16 output is less than a threshold value received from processor 22, or "1" when the PROM 16 output is greater than the threshold value. The threshold value is determined as discussed below.

Once binarizer 18 has converted the input data to zeros and ones, it is desirable to locate the center of potential targets. In the described embodiment, potential targets are assumed to contain 7×7 pixels or fewer. Other embodiments may detect targets of other sizes. The binary video image from binarizer 18 is input to multiple-pass centroid eroder 24. As described below in detail, centroid eroder 24 successively eliminates outer pixels from a potential target until only a single center pixel (a "hot spot") remains. The output of multiple-pass centroid eroder 24 is received by high-pass filter 26.

High-pass filter 26 preferably detects the presence of a pixel having an intensity of "1" surrounded by eight pixels having an intensity of "0". Thus, only objects that the eroder reduced to a single pixel are considered. Such a pixel is called a "hot spot". In other embodiments, another type of filter may detect "cold spots" or other useful categories of video data.

If a hot spot is detected by high-pass filter 26, hot spot counter 28 is incremented and the count value is stored in RAM 20. RAM 20 also stores a list of all detected hot spots. In a preferred embodiment, RAM 20 comprises two 512-word blocks of RAM. One block provides stable results of the prior cycle while the other block is being filled. The RAM is initialized to zeroes prior to a processing cycle.

FIGS. 2(a) and 2(b) show a timing diagram of the input video to the embodiment of FIG. 1. As shown in FIG. 2(a), a field synch (FSYNCH) signal goes low at the beginning of each new video field. The video image signal is input in a line-by-line fashion. A line synch (LSYNCH) signal goes low at the beginning of each line of video data. These two SYNCH signals, together with the scaled video clock, are used to generate control signals for the various memory elements in the invention (see FIG. 5(d)).

In the described embodiment, the MAV scaled video rate is 2.7427 MHz and the TAFS scaled video rate is 3.024 MHz. FIG. 2(b) shows a portion of the timing diagram of FIG. 2(a) in detail.

Figure 3:
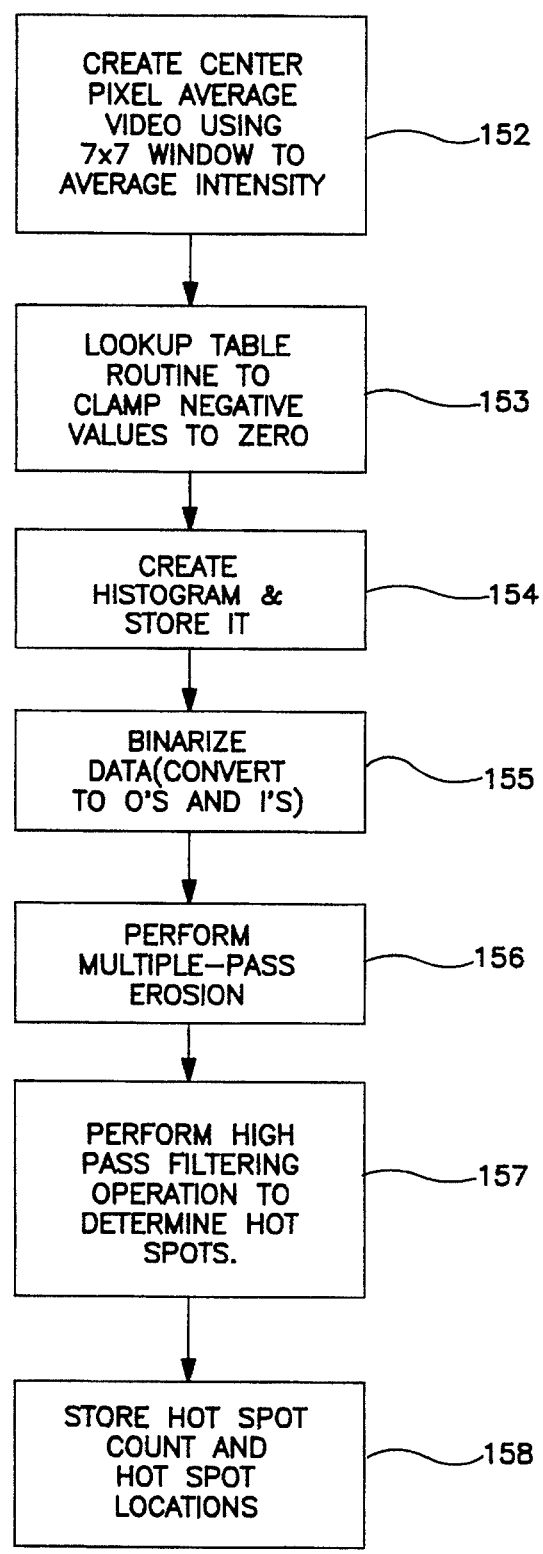
FIG. 3 is a flow chart showing the operation of the embodiment of FIG. 1.

FIG. 3 is a flow chart of the operation of the embodiment of the present invention shown in FIG. 1. In step 152, storage bin 10, average finder 12, and subtractor 14 create a high-pass filter (center pixel minus local average video signal) using a 7×7 window for averaging. In step 153, clipping PROM 16, and associated circuitry (see FIG. 5(a)), perform a look-up table routine to clamp negative values to zero for hot spots (assuming that processor 22 has indicated that negative intensity values should be clamped to zero, and assuming that processor 22 has not indicated that negative intensity values are not changed to their absolute value). In step 154, bin size register 15 and bin address generator 17 of FIG. 5(a) create a histogram of the data output from PROM 16. In step 155, binarizer 18 converts the video data to binary video data in accordance with threshold data received from processor 22.

In step 156, centroid eroder 24 performs multiple-pass centroid erosion, as described below. In step 157, high-pass filter 26 performs a filtering operation on the output from erode 24, to identify single-pixel hot spots, which, in step 158, are stored in RAM 20 along with a hot spot count.

Figures 4A, 4B:
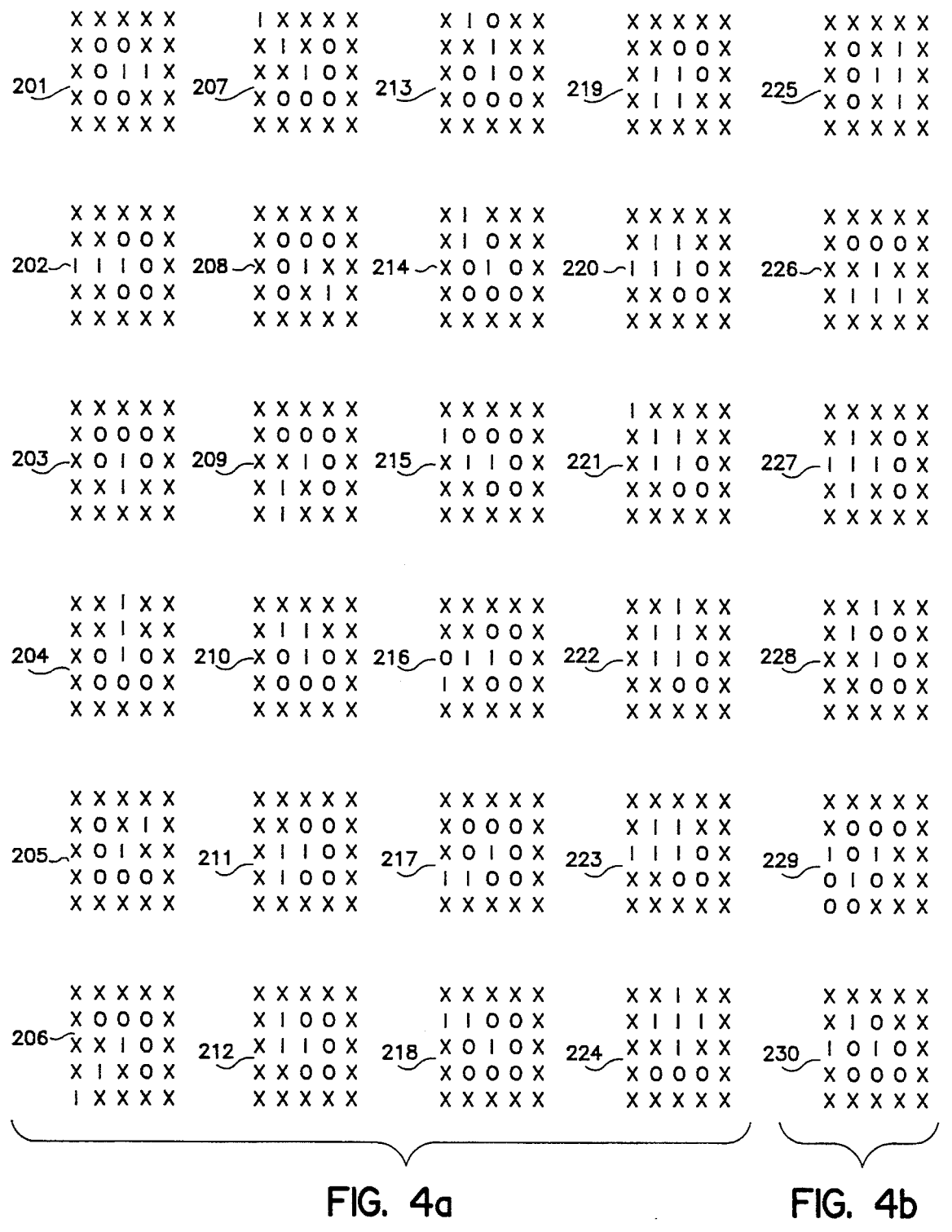

FIGS. 4(a) and 4(b) show a plurality of bit masks. Each of the bit masks is a 5×5 mask containing a mixture of zero values one values, and "don't care" values. As described below in detail, eroder 24 checks a moving window of 5×5 pixels of the binarized video data against each of the bit masks. If a match is found between the 5×5 window of video data and a bit mask, the pixel at the center of the 5×5 video window is changed from a "1" to a "0".

It should be understood that the plurality of bit masks shown in FIGS. 4(a) and 4(b) are only one example of bit masks that may be used in the present invention. Other 5×5 bit masks may be used if they function to erode video data, leaving at least one central pixel. In addition, as will be obvious to persons of ordinary skill in the art, other embodiments of the invention may use other sizes of bit masks. The size of the bit mask depends on factors such as the number of passes performed by the centroid eroder and the maximum expected target size. It should be noted that the described plurality of bit masks contains only thirty masks. In the described embodiment, these thirty masks are sufficient to erode any 7×7 pixel target to a single center pixel. Thus, in the described embodiment, the plurality of bit masks does not include every possible permutation of zeros and ones, or every possible permutation of zeros, ones, and don't-cares.

Figure 5A:
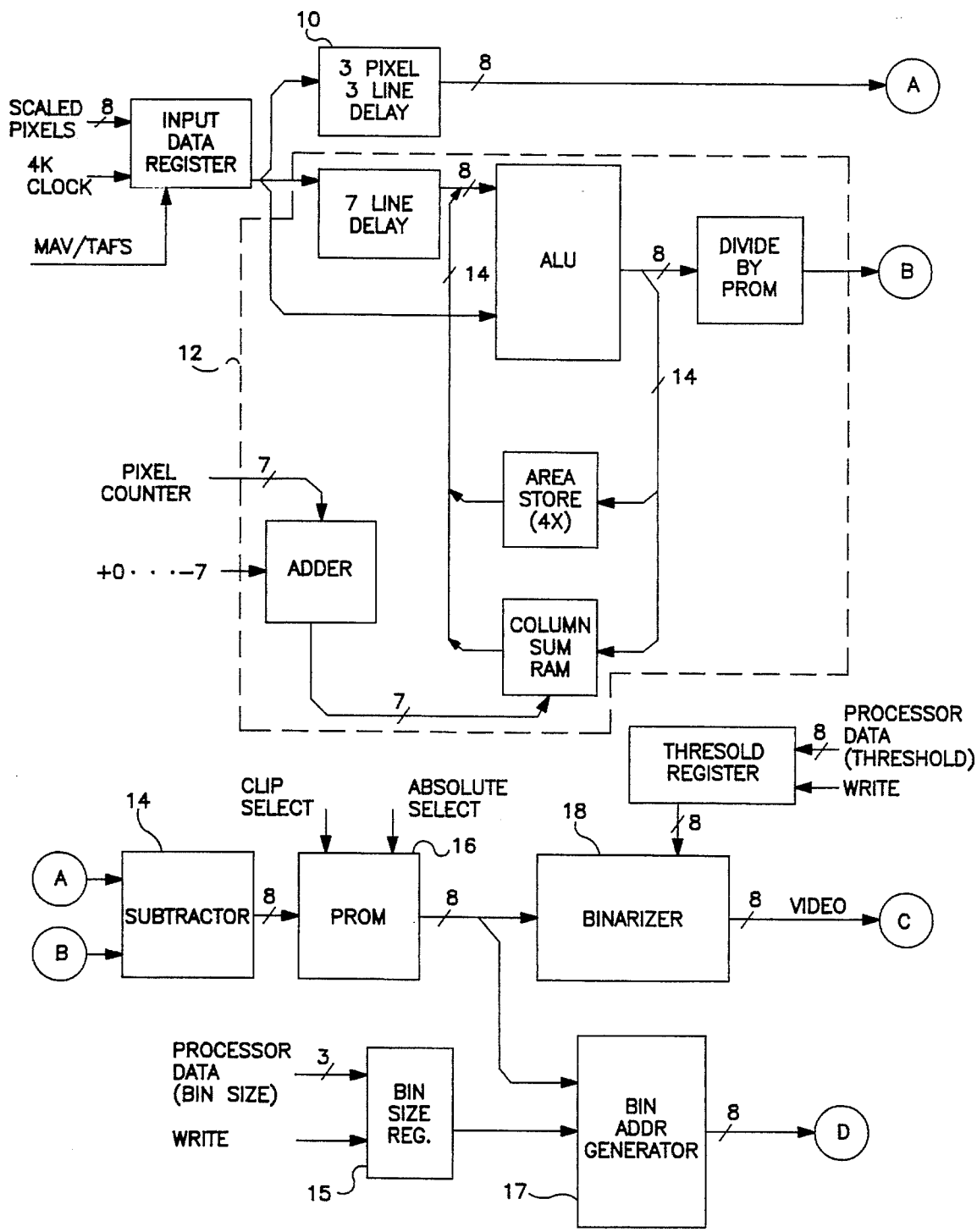
FIGS. 5(a)–5(d) are more detailed diagrams of the embodiment of FIG. 1.
Figure 5B:
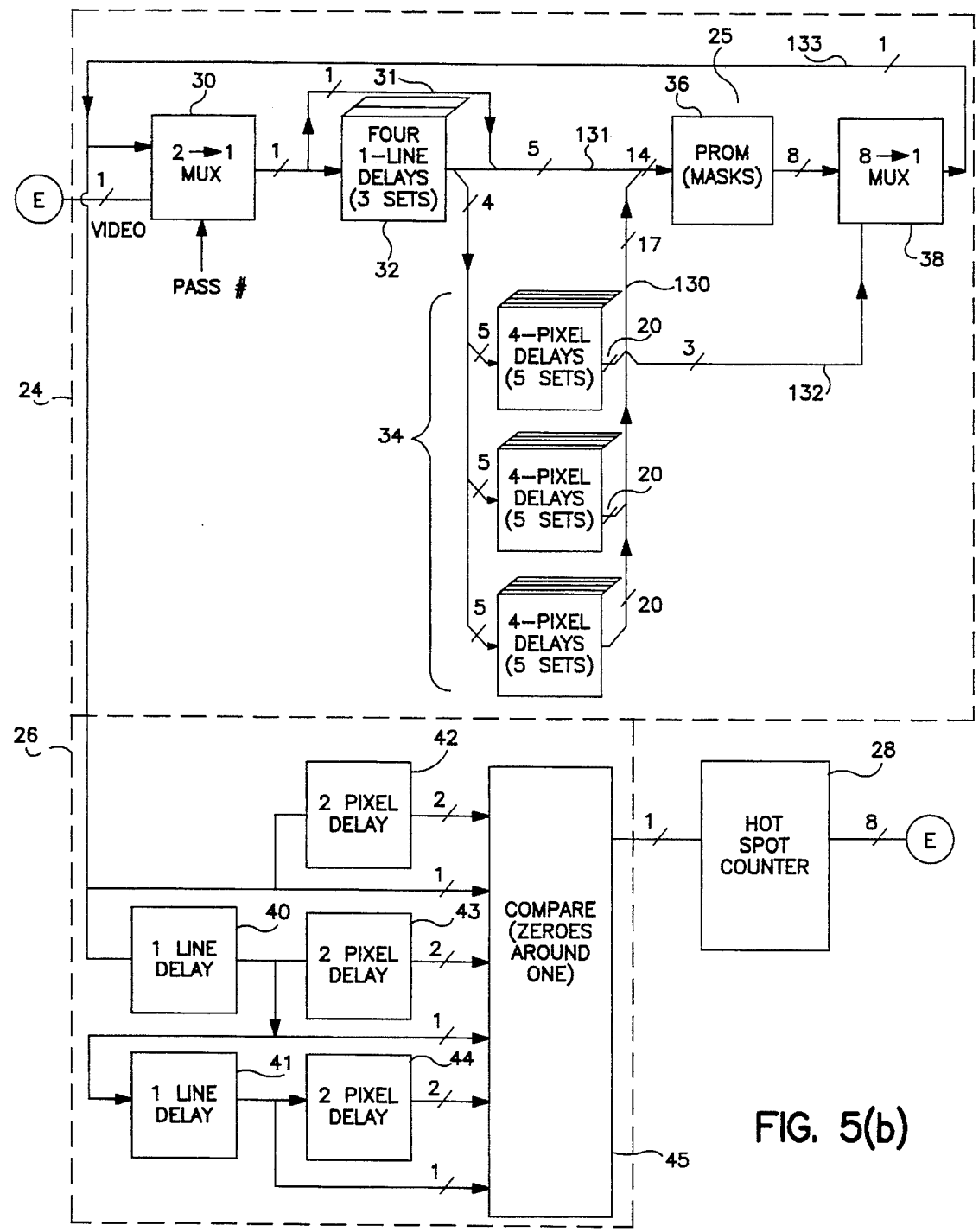
Figure 5C:
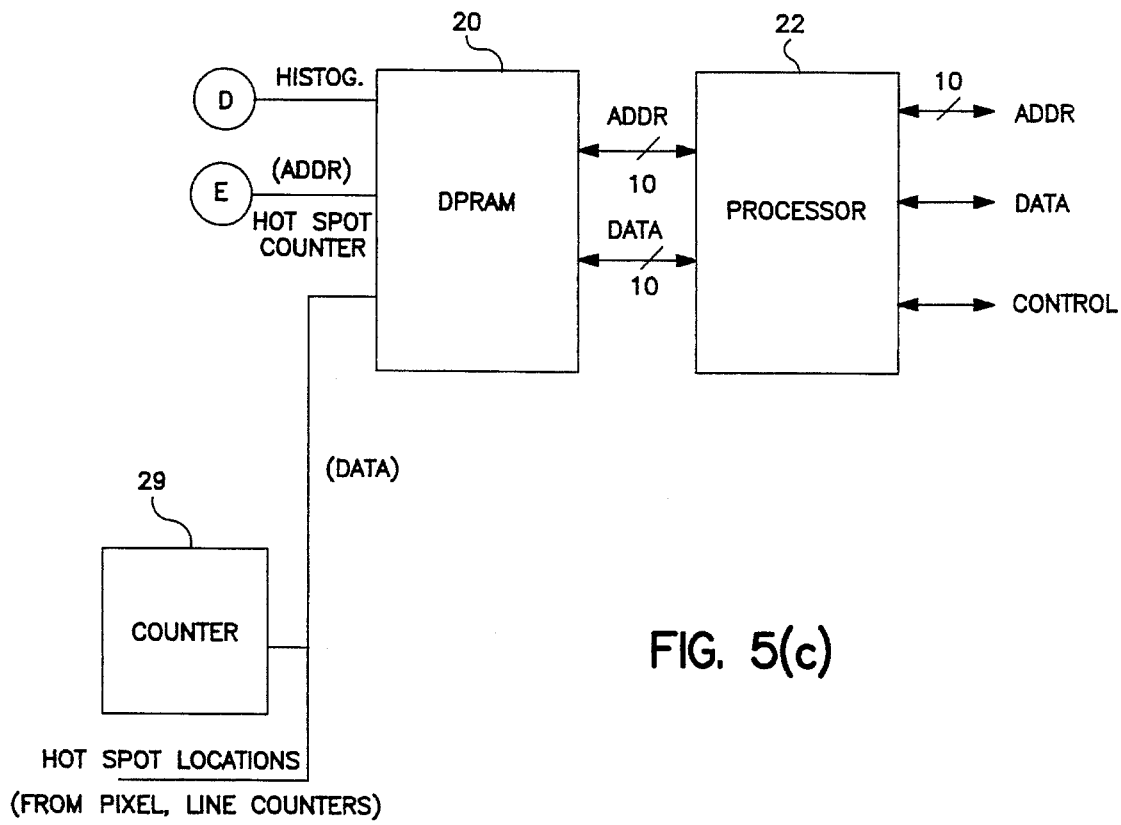
Figure 5D:
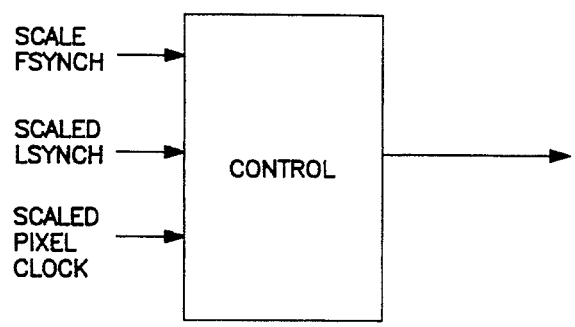

FIGS. 5(a)–5(d) show a more detailed example of the embodiment of FIG. 1. Only centroid eroder 24, high pass filter 26, RAM 20, and processor 22 will be discussed below. As can be seen in FIG. 5(b), in the described embodiment, multiple-pass centroid eroder 24 includes a two-to-one multiplexer 30, three sets of four one-line delays 32, three groups of five sets of four-pixel delays 34, a PROM 36, and an eight-to-one multiplexer 38. The number of sets of line delays and groups of pixel delays (i.e., three) corresponds to the number of eroder passes performed in the embodiment.

The operation of multiple-pass centroid eroder 24 will now be described in detail. In a preferred embodiment, multiple-pass centroid eroder 24 performs three interleaved passes. Three passes are performed because, in the described embodiment, the maximum expected target is 7×7 pixels in size. Thus, each pass of centroid eroder 24 removes one layer of pixels from around a center pixel of a potential target. After completion of pass three, only a center pixel remains. Examples of the operation of centroid eroder 24 are discussed below. As shown in FIGS. 5(a) and 5(b), binary video data is initially input to two-to-one multiplexer 30 from binarizer 18. During a first pass, the video data is serially output from two-to-one multiplexer 30 into a first one of a first set of four one-line delays 32. Subsequent lines of video data are serially input to subsequent sets of the line delays 32. Persons of ordinary skill in the art will understand that the timing of this operation, and the amount of data stored in each 1-line delay 32, depends on whether a first or a second type of video data (e.g., MAV or TAFS video data) is being input. This timing is determined in accordance with a MAV/TAFS select line (not shown).

The following paragraph describes how successive 5×5 windows of video data on five adjacent lines are processed. Once four lines of video data have been input to delays 32, a current line of video data appears serially on line 131. Once five lines of video are available in delays 32 and on line 131, a first group of five four-pixel delays 34 of a first set is filled with a first five columns of four lines. These first five columns are output on 20-bit line 130 (5 columns ×4 lines =20 bits). A fifth line from the first five lines of video data is output on 5-bit line 131. The three sets of four line delays 32 correspond to the three erosion passes, Pass 1, Pass 2, and Pass 3.

In the described embodiment, the bit masks shown in FIG. 4 are not directly stored in PROM 36. Each mask of FIG. 4 has 25 positions of data. As shown by X's in FIG. 7, in all the masks, only seventeen of these positions differ from mask to mask. The other eight mask positions have a don't care value in all of the masks. For example, row 1, column 5 of each mask has a same value of "don't care," while row 3, column 3 of all the masks has a same value of "1". In other words, row 3, column 3 of the moving binary data window is always checked to determine if it has a value of "1" during erosion processing. Thus, in FIG. 5(b), while a combined total of 25 bits of video data is present on lines 131 and 130, only fourteen of these bits are input to PROM 36. Another three bits from line 130 are input to multiplexer 38 (14+3= 17). The other eight bits, which correspond to positions not marked with an X in FIG. 7, are ignored.

Figures 7, 8, 9:
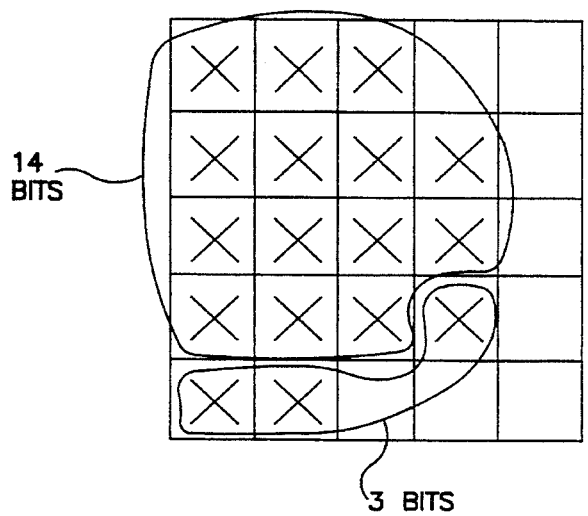
FIG. 7 shows locations that vary in the masks of FIG. 4.
FIG. 8 shows an example of contents of a PROM in the centroid eroder of FIG. 1.
FIG. 9 shows an example of a "hot spot" detected by a high pass filter of FIG. 1.

In the example, the fourteen bits of video data on lines 130 and 131 correspond to 14 of the bits shown marked with an "X" in FIG. 7. The three bits of video data input to multiplexer 38 correspond to another three bits shown in FIG. 7. Other embodiments may use other numbers of bits as addressing bits for PROM 36, depending on the size of the PROM and the contents of the masks. Other subsets of the bit positions of FIG. 7 may be used to address the PROM 36. In addition, other bit positions may be used as address bits, depending on the set of masks embodied in PROM 36.

FIG. 8 shows a portion of PROM 36. In the described embodiment, PROM 36 has $2^{14}$ entries that are addressed by the 14 bits from lines 130 and 131. Each entry has 8 bits, each bit indicating whether a center position of a current 5×5 pixel window should be set to "0" or remain unchanged ("1" or "0"). For example, if the 14 bits on lines 130 and 131 are all zeros, the first entry of PROM 36 is addressed and output to multiplexer 38. Multiplexer 38 selects one of the eight bits of the entry output from PROM 36 in accordance with the 3 bits on line 132.

Thus, for example, if a 5×5 block of video data is all zeroes, a first 8-bit entry 200 (having address 00000000000000) of FIG. 8 is output to multiplexer 38. Multiplexer 38 selects a bit corresponding to the three bits "000" (this bit has a value of "0" in FIG. 8,) and outputs that bit on line 133. The bit is input to multiplexer 30 and is stored in the next set of four line delays as input for the next erosion pass.

Figure 11:
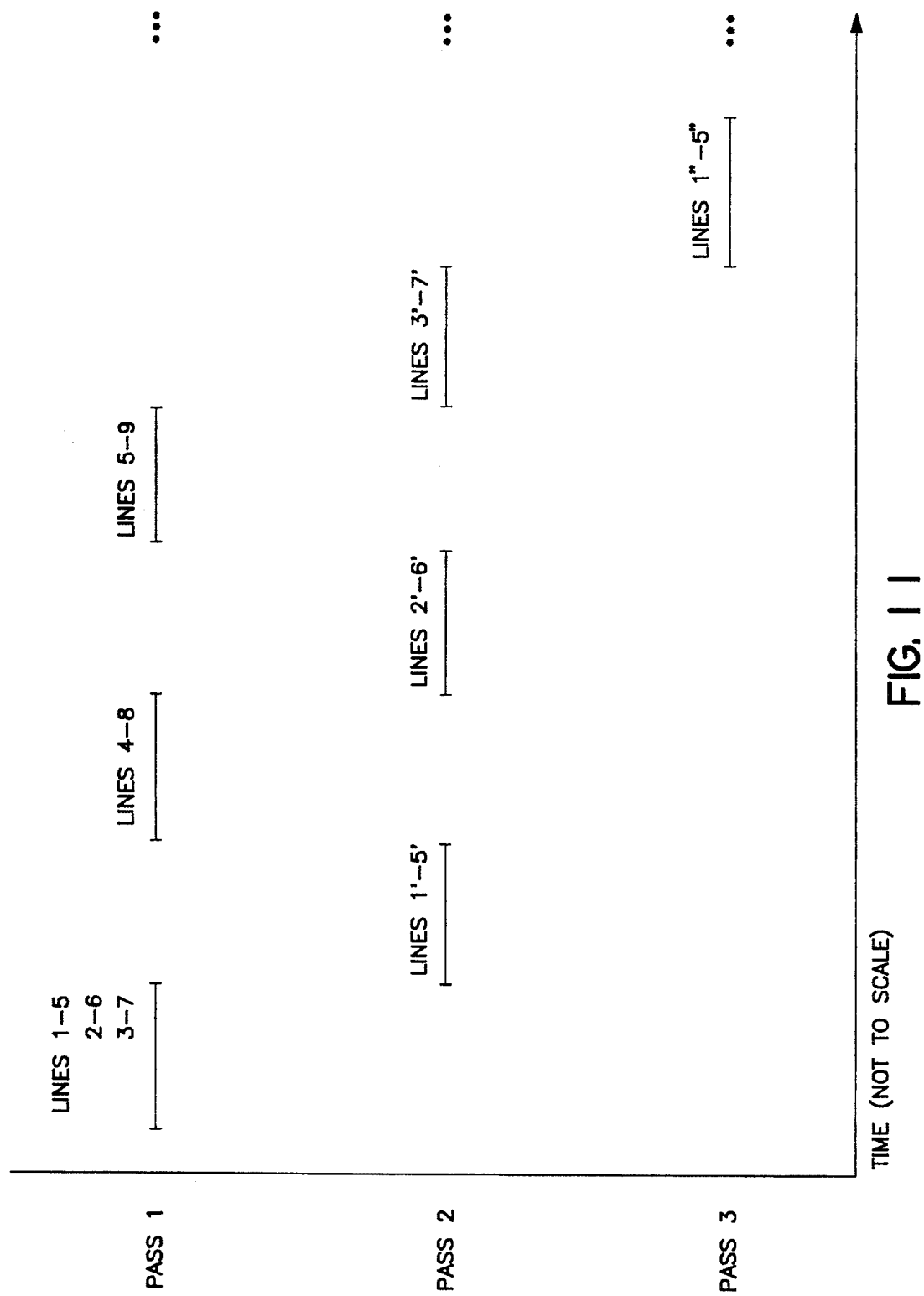
FIG. 11 is a timing chart showing how the three passes performed by the centroid eroder of FIG. 1 are interleaved.

The first line of the first pass is completed when all 5×5 windows of the first five lines have been processed. The output of the first pass represents the center (third) line of successive 5×5 windows and the output becomes the first line for the succeeding (second) erosion pass. When the first pass completes the first 7 lines of the binary video fields, 5 lines are ready for the second erosion pass. Similarly, the second pass output becomes the input for the third erosion pass, 2 lines later. The output from the third pass is input to the high-pass filter 26. An example of the timing of the interleaved passes is shown in FIG. 11.

As shown in FIG. 5(b), high pass filter 26 includes a one-line delay 40, a one-line delay 41, a two-pixel delay 42, a two-pixel delay 43, and a two-pixel delay 44. The purpose of high pass filter 26 is to detect a pattern of 1's and 0's such as that shown in FIG. 9. To this end, comparator 45 determines whether a predetermined (e.g., center) one of the bits from delay element 43 is a "1" and whether the remaining bits input to comparator 45 are 0's. If this is the case, a valid "hot spot" has been found, and comparator 45 outputs a "1" to hot spot counter 28.

Hot spot counter 28 preferably can count up to $2^8$ hot spots. The output of hot spot counter 28 is used to address RAM 20 and indicates where in RAM 20 a hot spot location is to be stored.

As shown in FIG. 5(c), the pixel and line count of detected hot spots are stored in RAM 20, along with a hot spot count, i.e. a number of hot spots detected, and a histogram from Clip/Absolute PROM 16 and its associated circuitry. The following paragraphs describe the data stored in RAM 20.

In the preferred embodiment, a hot spot list stored in RAM 20 can contain up to FF (hexadecimal) entries. The data format of an entry in the hot spot list preferably is:

Bits 0–6: pixel location of hot spot, and

Bits 8–14: line location of hot spot.

A separate location in RAM 20 stores a number of entries in the hot spot list, i.e., a hot spot count. In a preferred embodiment, pixel and line values are pipeline-compensated (pixel and line values are adjusted for delays through the digital logic, i.e., referenced to absolute 0,0 in top left of field of video).

In the preferred embodiment, RAM 20 stores a histogram from Clip/Absolute PROM 16 and its associated circuitry. If the histogram has a large number of bins, the data range of the values in those bins is reduced. The histogram preferably has one of the following formats:

| No. of Bins | Location of First Bin | Data Range |
|---|---|---|
| 32 | 30200H–3023EH | 0000H–FFFFH |
| 64 | 30200H–3027EH | 0000H–FFFFH |
| 128 | 30200H–302FEH | 0000H–7FFFH |
| 256 | 30200H–303FEH | 0000H–3FFFH |

Processor 22 is preferably a Z8000 microprocessor, manufactured by Zilog, Inc., but any processor or other apparatus having an operational speed adequate to perform the functions described herein could be used to implement the present invention.

Processor 22 preferably sends a 10 bit address to RAM 20 and receives and sends 16 bit data from RAM 20. In the preferred embodiment, processor 22 can read a hot spot count having values between 00 (hexadecimal) and FF (hexadecimal).

In the described embodiment, processor 22 outputs a threshold value to binarizer 18 of FIG. 5(a), a clipping value and an Absolute Select signal to Clip/Absolute PROM 16 of FIG. 5(a). The following paragraphs describe a preferred format of these values and how these values are determined.

Processor 22 outputs to binarizer 18 a threshold value data of between 0 and 256 (eight bits) in accordance with the histogram data stored in RAM 20. It is desirable that the threshold value cause an appropriate number of ones and zeroes to be output from binarizer 18. In a preferred embodiment, approximately three percent of the pixels in a video field should have a "1" value. Processor 22 adjusts the threshold value during operation whenever processor 22 determines from the histogram that an undesirable distribution of ones and zeroes has occurred or that the hot spot list is too long (threshold too low) or too short (threshold too high). Other embodiments may use other criteria to set a threshold value, or may use a predetermined threshold value, e.g., a threshold value set by a human user or read from a data base.

Processor 22 preferably also outputs a three bit clip selection address to Clip/Absolute PROM 16. This selection address selects one of eight pages in PROM 16 so that PROM 16 uses a correct one of a plurality of clipping tables in PROM 16. Each of the eight pages consists of a set of clip values and a set of absolute values. The select address has values as follows:

OH: select PROM table to convert negative values to zero, and pass positive values.

1H: select PROM tables to convert negative values to absolute, and pass positive, 2–15H: not assigned.

Processor 22 may alternately output values indicating a gamma clipping function to be used by PROM 16. The three bit selection address and gamma function together are called "clipping values."

In a preferred embodiment, the clipping values are set at the beginning of operation, e.g., by a human operator or in accordance with a value read from a data base. Other embodiments may determine the clipping values by other methods and at other times.

Processor 22 preferably also outputs a two bit bin select size value to bin size register 19 of FIG. 2(a) having values as follows:

OH: 256 bins,

1H: 128 bins,

2H: 64 bins, and

3H: 32 bins.

In a preferred embodiment, the bin size is set at the beginning of operation, e.g., by a human operator or in accordance with a value read from a data base. Other embodiments may determine the bin size values by other methods and at other times.

It should be understood that, in the described embodiment, video data is received alternately from a missile and from a targeting pod. The video data is scaled before being input to the invention in a manner known to persons of ordinary skill in the art. Other embodiments of the invention may receive data from different types of sources, or from one source or many. Other embodiments of the invention may receive data of sizes other than those described.

Figure 6O:
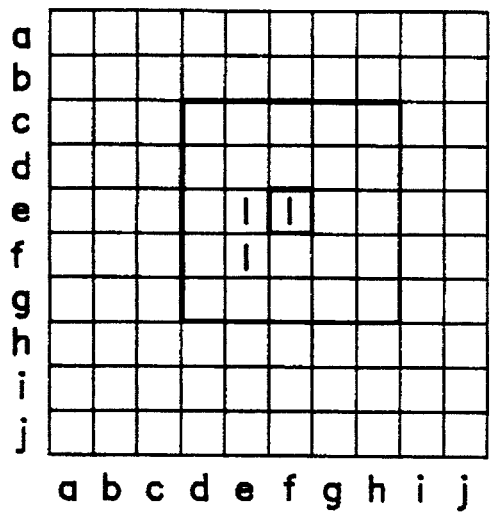
FIG. 6(o) shows a portion of input bits during a third pass of the centroid eroder of FIG. 1.
Figure 6P:
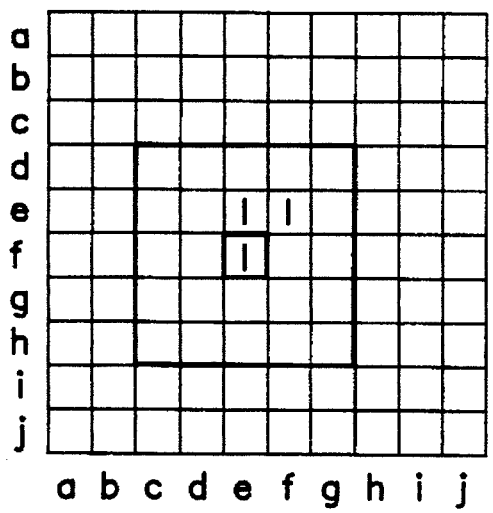
FIG. 6(p) shows a portion of input bits during a third pass of the centroid eroder of FIG. 1.
Figure 6Q:
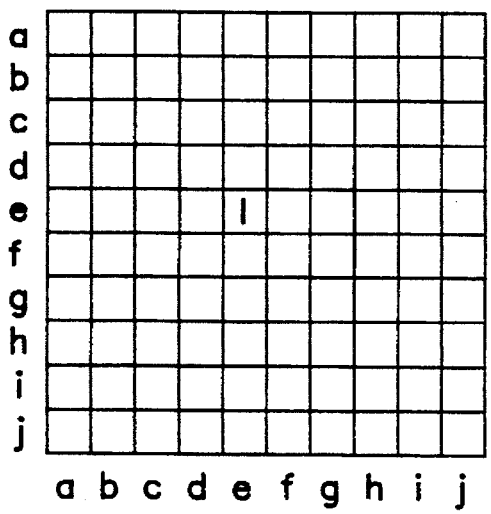
FIG. 6(q) shows the image data after completion of the second pass of the centroid eroder of FIG. 1.

FIG. 6(a) through FIG. 6(q) show an example of operation of the multiple-pass centroid eroder 24 of FIGS. 1 and 5 on a small portion of video data having 10×10 pixels. All bits not shown as a "1" bit are "0" bits. It should be understood that the video data shown in FIG. 6(a) through FIG. 6(q) is exemplary only, and is smaller than video data actually input to the described embodiment. The amount of data is reduced herein for purposes of explanation only. As will be described in connection with FIG. 11, the passes are interleaved in a preferred embodiment of the invention. Such interleaving is not described in connection with FIG. 6 for clarity of explanation.

FIG. 6(a) shows video data that is input to centroid eroder 24. The video data includes a potential target having a size of 6×6 pixels between rows c–h and columns c–h.

FIG. 6(b) shows the video data during a first pass of centroid eroder 24. In FIG. 6(b), centroid eroder 24 has determined that mask 203 of FIG. 4 matches the pixels shown enclosed by a heavy line. After determining that the 5×5 pixel window is matched by a bit mask, centroid eroder 24 changes the pixel at row c, column e from a "1" to a "0" by storing a "0" value in a second set of delays 32 of FIG. 5 (so that the changed bit will be used during pass 2). Center bits of 5×5 windows that are not changed are also output to delays 32 for pass 2.

In FIG. 6(c), centroid eroder 24 has determined that mask 202 of FIG. 4 matches the pixels shown enclosed by a heavy line. After determining that the 5×5 pixel window is matched by a bit mask, centroid eroder 24 changes the pixel at row e, column h from a "1" to a "0" by storing a "0" value in a second set of delays 32 of FIG. 5 (so that the changed bit will be used during pass 2).

In FIG. 6(d), centroid eroder 24 has determined that mask 201 of FIG. 4 matches the pixels shown enclosed by a heavy line. After determining that the 5×5 pixel window is matched by a bit mask, centroid eroder 24 changes the pixel at row f, column c from a "1" to a "0" by storing a "0" value in a second set of delays 32 of FIG. 5 (so that the changed bit will be used during pass 2).

In FIG. 6(e), centroid eroder 24 has determined that mask 221 of FIG. 4 matches the pixels shown enclosed by a heavy line. After determining that the 5×5 pixel window is matched by a bit mask, centroid eroder 24 changes the pixel at row g, column f from a "1" to a "0" by storing a "0" value in a second set of delays 32 of FIG. 5 (so that the changed bit will be used during pass 2).

In FIG. 6(f), centroid eroder 24 has determined that mask 204 of FIG. 4 matches the pixels shown enclosed by a heavy line. After determining that the 5×5 pixel window is matched by a bit mask, centroid eroder 24 changes the pixel at row h, column e from a "1" to a "0" by storing a "0" value in a second set of delays 32 of FIG. 5 (so that the changed bit will be used during pass 2).

FIG. 6(g) shows the video data after pass 1. The following paragraphs describe pass 2.

In FIG. 6(h), centroid eroder 24 has determined that mask 203 of FIG. 4 matches the pixels shown enclosed by a heavy line. After determining that the 5×5 pixel window is matched by a bit mask, centroid eroder 24 changes the pixel at row d, column e from a "1" to a "0" by storing a "0" value in a third set of delays 32 of FIG. 5 (so that the changed bit will be used during pass 3).

In FIG. 6(i), centroid eroder 24 has determined that mask 225 of FIG. 4 matches the pixels shown enclosed by a heavy line. After determining that the 5×5 pixel window is matched by a bit mask, centroid eroder 24 changes the pixel at row e, column d from a "1" to a "0" by storing a "0" value in a third set of delays 32 of FIG. 5 (so that the changed bit will be used during pass 3).

In FIG. 6(j), centroid eroder 24 has determined that mask 202 of FIG. 4 matches the pixels shown enclosed by a heavy line. After determining that the 5×5 pixel window is matched by a bit mask, centroid eroder 24 changes the pixel at row e, column g from a "1" to a "0" by storing a "0" value in a third set of delays 32 of FIG. 5 (so that the changed bit will be used during pass 3).

In FIG. 6(k), centroid eroder 24 has determined that mask 225 of FIG. 4 matches the pixels shown enclosed by a heavy line. After determining that the 5×5 pixel window is matched by a bit mask, centroid eroder 24 changes the pixel at row f, column d from a "1" to a "0" by storing a "0" value in a third set of delays 32 of FIG. 5 (so that the changed bit will be used during pass 3).

In FIG. 6(l), centroid eroder 24 has determined that mask 220 of FIG. 4 matches the pixels shown enclosed by a heavy line. After determining that the 5×5 pixel window is matched by a bit mask, centroid eroder 24 changes the pixel at row f, column f from a "1" to a "0" by storing a "0" value in a third set of delays 32 of FIG. 5 (so that the changed bit will be used during pass 3).

In FIG. 6(m), centroid eroder 24 has determined that mask 204 of FIG. 4 matches the pixels shown enclosed by a heavy line. After determining that the 5×5 pixel window is matched by a bit mask, centroid eroder 24 changes the pixel at row g, column e from a "1" to a "0" by storing a "0" value in a third set of delays 32 of FIG. 5 (so that the changed bit will be used during pass 3).

FIG. 6(n) shows the video data after pass 2. The following paragraphs describe pass 3.

In FIG. 6(o), centroid eroder 24 has determined that mask 211 of FIG. 4 matches the pixels shown enclosed by a heavy line. After determining that the 5×5 pixel window is matched by a bit mask, centroid eroder 24 changes the pixel at row e, column f from a "1" to a "0" by storing a "0" value in a fourth set of delays 32 of FIG. 5 (so that the changed bit will be output from pass 3).

In FIG. 6(p), centroid eroder 24 has determined that mask 205 of FIG. 4 matches the pixels shown enclosed by a heavy line. After determining that the 5×5 pixel window is matched by a bit mask, centroid eroder 24 changes the pixel at row f, column e from a "1" to a "0" by storing a "0" value in a fourth set of delays 32 of FIG. 5 (so that the changed bit will be output from pass 3).

Thus, as can be seen in the above example, each pass performed by centroid eroder 24 removes an "outer layer" of pixels having a value of "1" from around a center pixel. After three passes have been performed, only the center pixel, such as the pixel at row e, column e of FIG. 6(q) remains. This center pixel is detected by high-pass filter 26.

FIG. 11 is a timing chart showing interleaving of the three passes performed by centroid eroder 24 of FIGS. 1 and 5. Persons of ordinary skill in the art will understand the control circuitry necessary to implement the timing chart of FIG. 11, and such timing circuitry is not shown in FIGS. 1 and 5 for the sake of clarity of explanation. Interleaving of the three passes is performed as follows. First, in Pass 1, eroder 24 processes all 5×5 windows occurring on lines 1–5 of the input data stored in the first set of delays 24. Then, in Pass 1, eroder 24 processes all 5×5 windows occurring on lines 2–6. Then, in Pass 1, eroder 24 processes all 5×5 windows occurring on lines 3–7. A center pixel of each 5×5 window on lines 1–7 is passed into the second set of delays 32 to be input to Pass 2.

Next, in Pass 2, eroder 24 processes all 5×5 windows occurring on lines 1'–5' from the second set of delays 32. The center pixel of each 5×5 window is passed into the third set of delays 32 to be input to Pass 3. Next, in Pass 1, eroder 24 processes all 5×5 windows occurring on lines 4–8 from the first set of delays 32. Again, the outputs is passed into the second set of delays 32 for input to Pass 2.

Next, in Pass 3, eroder 24 processes all 5×5 window occurring on lines 1"–5" from the third set of delays 32. The center pixel of each 5×5 window processed by Pass 3 is passed into high pass filter 26 of FIG. 1. Erosion processing continues in this manner until all of the input data has had three passes performed upon it.

Interleaving the three passes allows the output from Pass 1 to be input to Pass 2, and allows output from Pass 2 to be input to Pass 3. Thus, all input to the first set of delays 32 for Pass 1 is received from the video input line through MUX 30, while input to the second set of delays 32 for Passes 2 and 3 is received from line 133 through MUX 30.

The above discussion deals with how hot spot lists are determined and stored in RAM 20. The following paragraphs discuss how the described embodiment uses the hot spot lists. It should be understood that other embodiments may create any number of hot spot lists and may make various uses of the created hot spot lists.

Figure 10:
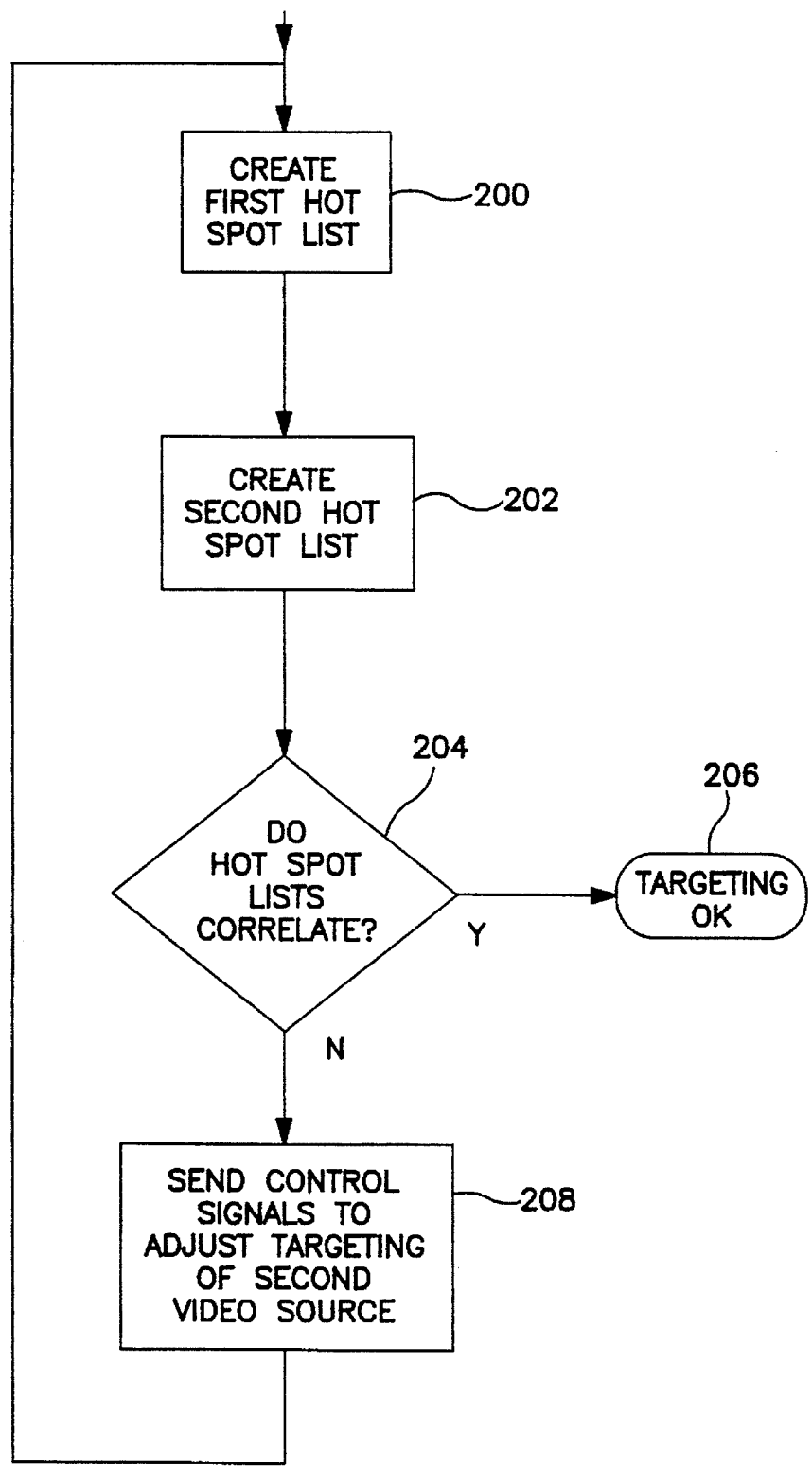
FIG. 10 is a flow chart of operations performed by a processor of FIG. 1 after hot spots have been detected.

FIG. 10 is a flowchart of operations performed by processor 22 to correlate two hot spot lists stored in RAM 20. In step 200, a first hot spot list is created and stored in RAM 20. In step 202, a second hot spot list is created and stored in RAM 20. In the described embodiment, these two lists are created during a time period when two types of input data are alternatively received. The first hot spot list corresponds to the first input data and the second hot spot corresponds to the second input data. In step 204, processor 22 computes a relative offset between the two images through the implementation of a correlation algorithm.

In the described embodiment, an offset determination is made by processor 22 using a "constellation correlation" process, which is an implementation of Hough's algorithm as described in the textbook *Digital Image Processing* by Gonzalez and Wintz, Addison-Wesley Publishing Co., Advanced Book Program, Reading, Mass., 1977, which is herein expressly incorporated by reference. Any other method of correlating the two hot spot lists may also be used to practice the invention.

If, in step 204, the two hot spot lists correlate, targeting is complete and no action is taken. Otherwise, the heading and/or orientation of one of the video sources is altered in accordance with the offset value resulting from the correlation process, and the process of FIG. 10 is repeated. Thus, a feedback loop continuously adjusts the heading of one of the video sources until the video data received from the two video sources is in substantial correlation.

In conclusion, the present invention is an improvement over previous target indicators at least because it employs a multiple-pass centroid eroder. In this described embodiment, this centroid eroder is implemented in hardware, and operates at a speed of four times the data rate of the input signals. (An initial pass zero of the centroid eroder is used to clear data from a previous pass.) Thus, the centroid eroder of the present invention does not appreciably slow the operation of the targeting system, and the centroid eroder is able to identify a center point for potential targets.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. An apparatus for detecting and identifying potential target data in video data images, comprising:

means for receiving alternating first and second video data images from ones of a first and a second video source;

means for performing a multiple-pass erosion function on the received video data images, using a plurality of masks, each mask having a size of at least 5×5 pixels, and yielding centroid data indicating a location of a potential target in the video data images;

means for storing the centroid data indicating the location of the potential target as an entry in hot spot lists;

correlation means for determining whether the first and second video data images are aligned in accordance with said hot spot lists; and correcting means for sending course correcting signals to the second video data source until the correlation means determines that the first and second video data images are aligned.

2. The apparatus of claim 1, further including scaling means for scaling the first and second video data images to have substantially the same scale.

3. A method performed by a computer for detecting and identifying potential target data in video data images, the method comprising the steps of:

receiving alternating first and second video data images from ones of a first and a second video source;

performing a multiple-pass erosion function on the received video data images, using a plurality of masks, each mask having a size of at least 5×5 pixels, to yield centroid data indicating a location of a potential target in the video data images;

storing the centroid data indicating the location of the potential target as an entry in hot spot lists;

determining whether the first and second video data images are aligned in accordance with said hot spot lists; and sending course correcting signals to the second video data source until it is determined that the first and second video data images are aligned.

4. The method of claim 3, further comprising the step of:

scaling the first and second video data images to have substantially the same scale.

* * * * *

UNITED STATES PATENT AND TRADEMARK OFFICE
CERTIFICATE OF CORRECTION

PATENT NO. : 5,479,526
DATED : December 26, 1995
INVENTOR(S) : Richard W. BENTON et al.

It is certified that error appears in the above-indentified patent and that said Letters Patent is hereby corrected as shown below:

Col. 4, line 8, "12 14" should read --12, 14--; and line 17, "pixel" should read --pixel.--.

Col. 5, line 14, "erode" should read --eroder--; and line 18, "values" (first occurrence) should read --values,--.

Col. 8, line 24, there should be no line break after "zero,".

Signed and Sealed this

Nineteenth Day of March, 1996

Attest:

BRUCE LEHMAN

Attesting Officer   Commissioner of Patents and Trademarks